US009028221B2

(12) United States Patent
Hritz

(10) Patent No.: US 9,028,221 B2
(45) Date of Patent: May 12, 2015

(54) AIR COMPRESSOR WITH OIL PUMP INLET STRAINER BYPASS VALVE

(75) Inventor: Jeffrey Hritz, Pittsburgh, PA (US)

(73) Assignee: Wabtec Holding Corp., Wilmerding, PA (US)

( * ) Notice: Subject to any disclaimer, the term of this patent is extended or adjusted under 35 U.S.C. 154(b) by 562 days.

(21) Appl. No.: 13/047,034

(22) Filed: Mar. 14, 2011

(65) Prior Publication Data

US 2012/0234741 A1  Sep. 20, 2012

(51) Int. Cl.

| F04B 39/04 | (2006.01) |
|---|---|
| F04B 49/00 | (2006.01) |
| F01M 1/00 | (2006.01) |
| B01D 29/05 | (2006.01) |
| B01D 35/153 | (2006.01) |
| F01M 11/00 | (2006.01) |

(52) U.S. Cl.
CPC .............. *B01D 29/05* (2013.01); *B01D 35/153* (2013.01); *F01M 2011/007* (2013.01)

(58) Field of Classification Search
CPC ...... F04B 39/02; F04B 39/0284; F04B 39/16; F04B 53/10; F04B 53/1002; F04B 2201/0406; F04B 2207/70; F04B 2207/701; F04B 2207/702; B01D 35/1475; B01D 2201/16; F01M 11/03; F01M 11/0408; F01M 2011/07
USPC ......... 417/63, 228, 273; 184/6.16, 6.21, 6.24; 210/90, 91
See application file for complete search history.

(56) References Cited

U.S. PATENT DOCUMENTS

| 2,285,997 | A | * | 6/1942 | Mino ............................ 210/132 |
| 2,875,850 | A | * | 3/1959 | Glass et al. .................. 184/6.16 |
| 3,358,836 | A | * | 12/1967 | Schmitt ........................... 210/90 |
| 3,644,915 | A | * | 2/1972 | McBurnett .................... 340/607 |
| 3,662,887 | A | * | 5/1972 | Uhlhorn, Jr. .................. 210/131 |
| 4,129,503 | A | * | 12/1978 | Joseph .......................... 210/232 |
| 4,304,663 | A | * | 12/1981 | Manders ........................ 210/90 |
| 4,366,837 | A | * | 1/1983 | Roettgen ....................... 137/557 |
| 6,289,726 | B1 | * | 9/2001 | Ferris et al. ................. 73/114.38 |
| 6,447,267 | B1 | | 9/2002 | Varney et al. |
| 6,638,423 | B2 | * | 10/2003 | Dockery ........................ 210/132 |
| 2003/0201216 | A1 | * | 10/2003 | Wolford et al. ............... 210/130 |
| 2009/0256095 | A1 | | 10/2009 | Osterwise et al. |
| 2010/0122808 | A1 | | 5/2010 | Hritz |

* cited by examiner

*Primary Examiner* — Bryan Lettman
*Assistant Examiner* — Timothy P Solak
(74) *Attorney, Agent, or Firm* — The Webb Law Firm

(57) ABSTRACT

An air compressor with oil pump inlet strainer bypass features, including a bypass valve assembly in fluid communication with the air compressor crankcase to provide lubricating oil to the dynamic compressor components, or simply to the air compressor. The bypass valve assembly includes a valve housing defining an interior chamber and an oil strainer screen engaged with the valve housing to filter the lubricating oil entering the interior chamber. A bypass valve is in fluid communication with the interior chamber and includes a valve body having a bypass port and an indicator port. An optional suction tube is connected to the bypass port on the valve body. An indicator assembly is connected to the indicator port on the valve body.

20 Claims, 3 Drawing Sheets

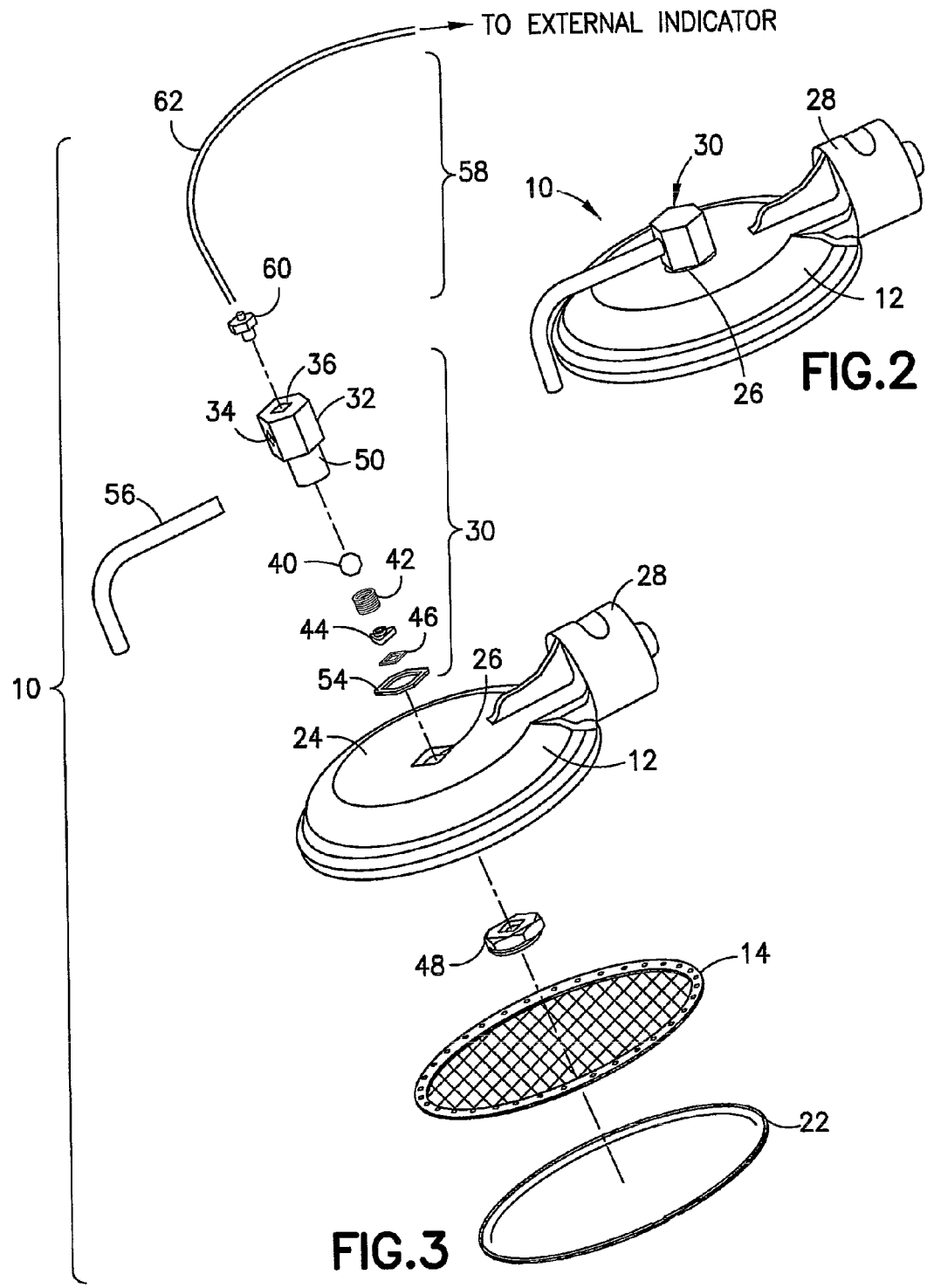

AIR COMPRESSOR WITH OIL PUMP INLET STRAINER BYPASS VALVE

BACKGROUND OF THE INVENTION

1. Field of the Invention

The present invention relates to the field of air compressors adapted for use on rail vehicles and, more particularly, to avoiding air compressor failure due to oil pump inlet strainer obstructions.

2. Description of Related Art

Normally, a pneumatic system is provided for a rail vehicle by which the brakes of the rail vehicle are operated. An air compressor is used to supply compressed air to one or more pneumatic units associated with the rail vehicle involved in the operation of the brakes. The air compressor usually consists of a driving unit, such as an electric motor, and a compressor unit, which typically consists of several piston-cylinder arrangements that are driven by a crankshaft. The crankshaft is driven by the driving unit and includes connecting rods to convert the rotating movement of the driving unit into linear movement for each piston to supply compressed air to the downstream units. Screw-type air compressors are also generally known in the field for this purpose and are also included within the scope of the present invention. Furthermore, air compressor units for use on rail vehicles may have a single-stage or a multi-stage construction with at least one low-pressure stage and one high-pressure stage. The air compressors used in the rail vehicle field may be subjected to continuous operation or to frequent on-and-off operation. In either mode of operation, friction during operation of the compressor leads to high heat development. As a result, air compressors predominantly used in the rail vehicle field use oil lubrication to ensure sufficient lubrication and cooling during operation.

Air compressors used on rail vehicles typically have an oil strainer located at the inlet to the air compressor oil pump which is designed to filter large particles, such as carbon debris. The oil strainer prevents entry of particles and other debris into the oil pump and from being passed through the moving components of the air compressor. Over time, the strainer screen becomes increasingly obstructed by the particles and debris being filtered. As the degree of obstruction increases, air compressor damage can occur due to a decrease in oil flow and pressure reaching the moving components. This damage can eventually result in air compressor failure. If the strainer screen becomes 100% obstructed, air compressor failure will occur unless the strainer screen itself fails, allowing oil to pass to the oil pump inlet. One known prior art solution to avoid strainer screen obstruction issues is to entirely remove or omit the strainer screen, but this solution also eliminates the benefits of pre-filtering the lubricating oil used in the air compressor.

SUMMARY OF THE INVENTION

The present invention is generally directed to avoiding air compressor failure due to oil pump inlet strainer obstructions by providing an oil pump inlet strainer bypass valve assembly for the air compressor. The bypass valve assembly desirably includes an indicator system or assembly that indicates when the bypass valve assembly is in a bypass mode and is, therefore, in need of maintenance. The bypass valve assembly, as described in detail herein, addresses the problem of air compressor failure due to oil pump inlet strainer obstructions while maintaining the benefits of pre-filtering the lubricating oil used in the air compressor using a strainer screen, and generally allows for improved maintenance practices. The indicator system or assembly of the bypass valve assembly, as described in detail herein, may be embodied to provide a visual indication of when maintenance is required. Further, the bypass valve assembly provides improved lubrication in cold temperature environments.

In one embodiment described in detail herein, an air compressor with oil pump inlet strainer bypass features is disclosed that includes a bypass valve assembly in fluid communication with the air compressor crankcase to provide lubricating oil to the dynamic compressor components or, simply, to the compressor. The bypass valve assembly includes a valve housing defining an interior chamber and an oil strainer screen engaged with the valve housing to filter the lubricating oil entering the interior chamber. A bypass valve is in fluid communication with the interior chamber and includes a valve body having a bypass port and an indicator port. A suction tube is connected to the bypass port on the valve body. An indicator assembly is connected to the indicator port on the valve body. The bypass valve opens to permit lubricating oil to enter the interior chamber via the suction tube without passing through the oil strainer screen when a predetermined differential pressure across the oil strainer screen is reached.

The valve housing comprises an outlet port for connection to an oil pump. The bypass valve may be supported in an opening in the valve housing leading to the interior chamber. The bypass valve may comprise a spring-biased ball valve. The oil strainer screen may be seated in a strainer port opening in the valve housing.

The indicator assembly comprises an indicator tube connected with the indicator port on the valve body, and a condition indicator in fluid communication with the indicator tube. The condition indicator may be a mechanical or an electronic device. The condition indicator may include a display to indicate that the bypass valve is open and permitting lubricating oil to enter the interior chamber via the suction tube without passing through the oil strainer screen. The condition indicator display may register a change of visual indicia to indicate that the bypass valve is open and permitting lubricating oil to enter the interior chamber via the suction tube without passing through the oil strainer screen. The condition indicator may be adapted to detect a vacuum condition in the indicator tube.

In another embodiment, a bypass valve assembly for providing lubricating oil to an air compressor is disclosed. The bypass valve assembly is in fluid communication with the air compressor crankcase to provide lubricating oil to the dynamic compressor components or, simply, to the compressor. The bypass valve assembly includes a valve housing defining an interior chamber and an oil strainer screen engaged with the valve housing to filter the lubricating oil entering the interior chamber. A bypass valve is in fluid communication with the interior chamber and includes a valve body having a bypass port and an indicator port. A suction tube is connected to the bypass port on the valve body. An indicator assembly is connected to the indicator port on the valve body. The bypass valve opens to permit lubricating oil to enter the interior chamber via the suction tube without passing through the oil strainer screen when a predetermined differential pressure across the oil strainer screen is reached.

The valve housing comprises an outlet port for connection to an oil pump. The bypass valve may be supported in an opening in the valve housing leading to the interior chamber. The bypass valve may comprise a spring-biased ball valve. The oil strainer screen may be seated in a strainer port opening in the valve housing.

The indicator assembly comprises an indicator tube connected with the indicator port on the valve body, and a condition indicator in fluid communication with the indicator tube. The condition indicator may be a mechanical or an electronic device. The condition indicator may include a display to indicate that the bypass valve is open and permitting lubricating oil to enter the interior chamber via the suction tube without passing through the oil strainer screen. The condition indicator display may register a change of visual indicia to indicate that the bypass valve is open and permitting lubricating oil to enter the interior chamber via the suction tube without passing through the oil strainer screen. The condition indicator may be adapted to detect a vacuum condition in the indicator tube.

Further details and advantages of the various embodiments described in detail herein will become clear upon reviewing the following detailed description of the preferred embodiments in conjunction with the accompanying drawing figures.

BRIEF DESCRIPTION OF THE DRAWINGS

FIG. 2 is a perspective view of the bypass valve assembly used in the air compressor shown in FIG. 1.

FIG. 3 is an exploded view of the bypass valve assembly shown in FIG. 2.

DESCRIPTION OF THE PREFERRED EMBODIMENTS

For purposes of the description hereinafter, spatial orientation terms, as used, shall relate to the referenced embodiment as it is oriented in the accompanying drawing figures or otherwise described in the following detailed description. However, it is to be understood that the embodiments described hereinafter may assume many alternative variations and configurations. It is also to be understood that the specific components, devices, and features illustrated in the accompanying drawing figures and described herein are simply exemplary and should not be considered as limiting.

Figure 1:
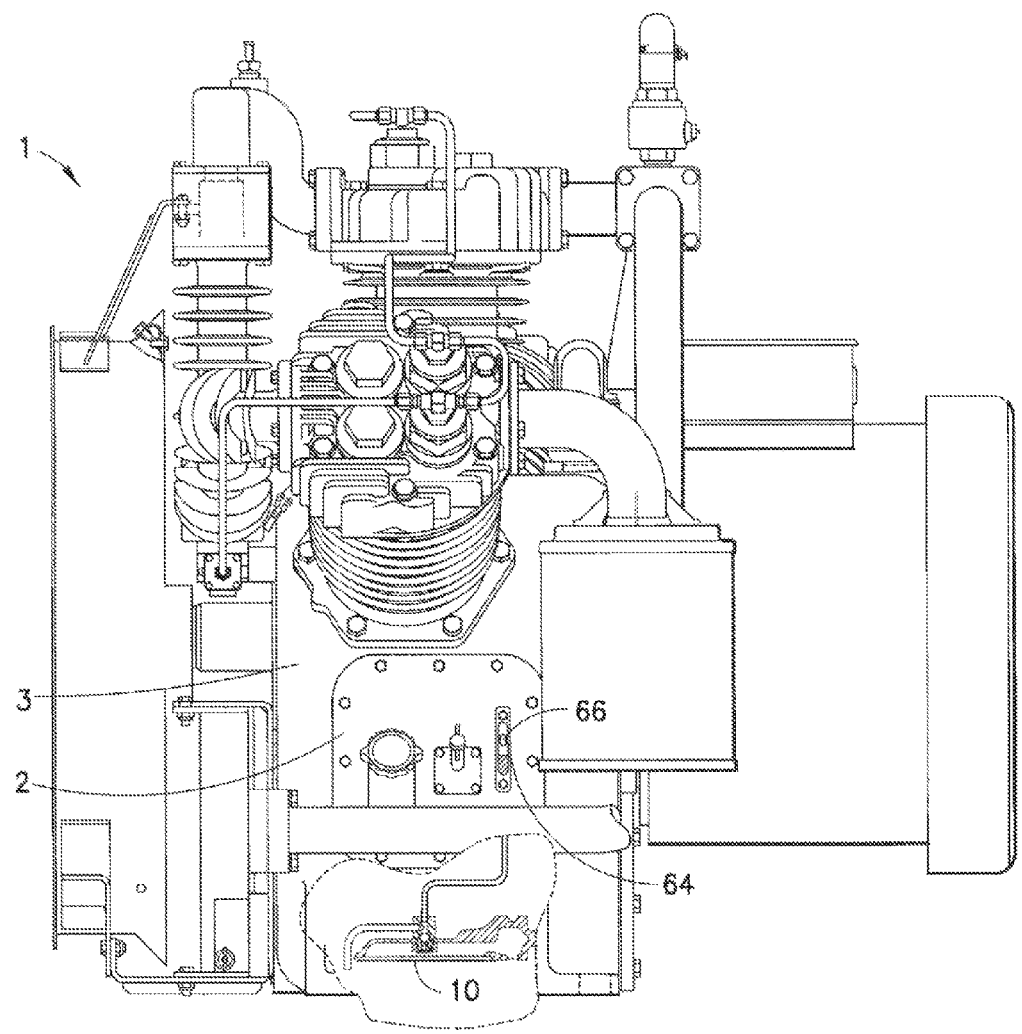
FIG. 1 is an elevational view of an embodiment of an air compressor having an oil pump inlet strainer bypass valve assembly.
Figure 4:
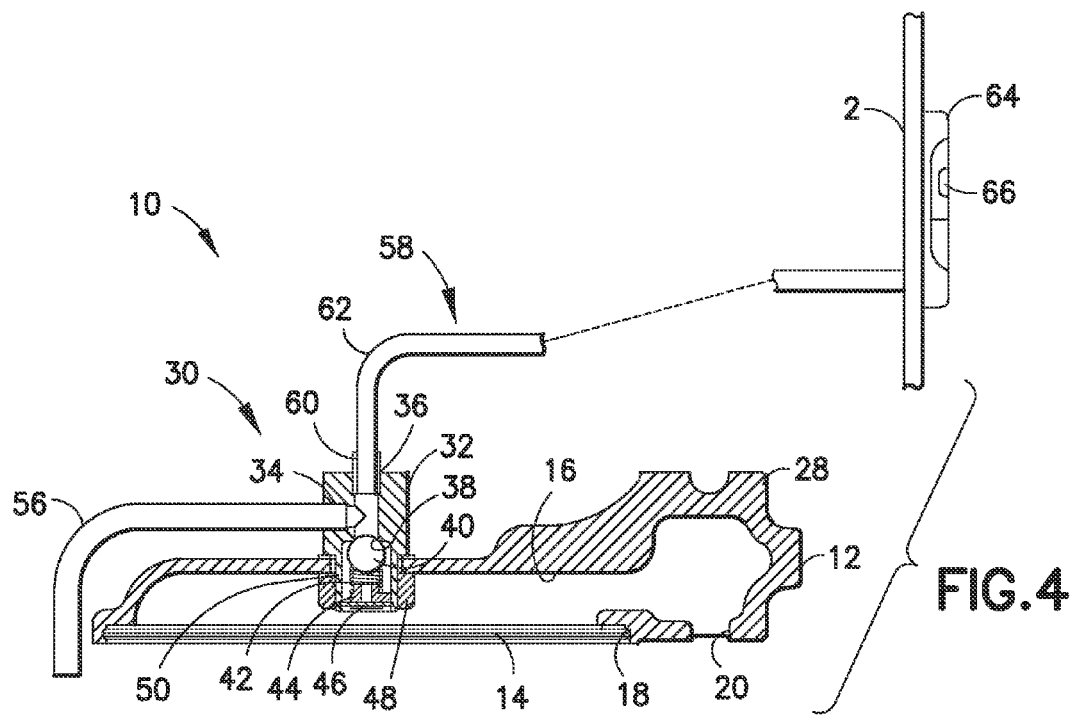
FIG. 4 is a cross-sectional view of the bypass valve assembly shown in FIG. 2, further schematically illustrating communication with a condition indicator.
Figure 5:
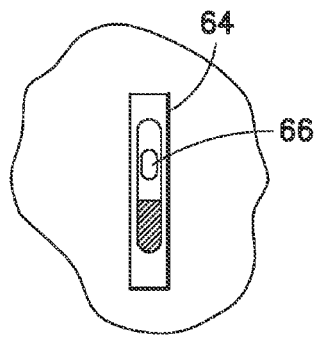
FIG. 5 is an isolation view of the maintenance indicator shown in FIG. 4.

Referring to FIGS. 1-5, a multi-cylinder air compressor 1 is shown which includes an oil pump inlet strainer bypass valve assembly 10 (hereinafter "bypass valve assembly 10") that is intended to address the issue of air compressor failure due to a fully or partially obstructed oil strainer screen. As described previously, an oil strainer screen is typically located at the inlet of an oil pump, namely, in the oil pump suction line, and functions to filter large particles and debris from the air compressor lubricating oil prior to this oil entering the oil pump. As the hours of air compressor operation increase, this oil strainer screen can become fully or partially obstructed resulting in air compressor damage and eventual failure. The bypass valve assembly 10 is embodied to maintain oil flow to the air compressor oil pump in the event of full or partial oil strainer screen obstruction, thereby preventing air compressor damage or failure.

The bypass valve assembly 10 comprises a valve housing 12 that is located on top of and engaged with an oil strainer screen 14 (hereinafter "strainer screen 14"). In particular, the valve housing 12 defines an interior chamber 16, a strainer port opening 18, and an outlet port 20. The strainer port opening 18 is configured to accept and support the strainer screen 14 and the strainer screen 14 is held in place in the strainer port opening 18 via a retaining ring 22. A top wall 24 of the valve housing 12 defines a central opening 26 to accept and secure a bypass valve 30 to the valve housing 12. The valve housing 12 further comprises a mounting portion 28 used to mount the bypass valve assembly 10 to the air compressor 1.

The bypass valve 30 comprises a valve body 32 defining a bypass port 34, an indicator port 36, and a valve seat 38. A ball check 40 is located within the valve body 32 and is biased into engagement against the valve seat 38 by a biasing spring 42. The ball check 40 and spring 42 are secured within the valve body 32 by a valve stop 44, a retaining ring 46, and a locknut 48. A stem portion 50 of the valve body 32 extends through the central opening 26 in the top wall 24 of the valve housing 12 and is secured in connection with the valve housing 12 by the locknut 48 located within the interior chamber 16 of the valve housing 12. A sealing washer 54 is provided on the stem portion 50 so that a generally fluid-tight seal is present between the valve body 32 and valve housing 12. A suction tube 56 is connected to the bypass port 34 on the valve body 32, and an indicator system or assembly 58 is connected to the indicator port 36 on the valve body 32. The suction tube 56 may be provided as part of the assembly 10 or as a part of the air compressor 1. The indicator assembly 58 comprises a valve connector 60 used to connect an indicator tube 62 with the indicator port 36 on the valve body 32, and a condition indicator 64 in fluid communication with the indicator tube 62. The condition indicator 64 may be mounted to a panel 2 on the air compressor 1. The condition indicator 64 may be a mechanical or an electronic device.

Generally, the bypass valve assembly 10 operates based on the differential pressure across the strainer screen 14. When the differential pressure increases above a set limit, indicating that the strainer screen 14 is at least partially blocked or fouled with particulate matter and debris, the ball check 40 lifts from the valve seat 38 allowing lubricating oil to enter the valve housing 12 on the oil pump side of the strainer screen 14 via the bypass suction tube 56. The lubricating oil is pulled from the crankcase through the suction tube 56 into the valve housing 12 and then into the inlet to the oil pump (not shown) connected to the outlet port 20. The suction that is created in the valve housing 12 when the bypass valve 30 opens creates a vacuum in the indicator tube 64. This vacuum is sensed, either mechanically or electronically, by the condition indicator 64 mounted, for example, on an access panel 2 which may be on a crankcase 3 of the air compressor 1. The vacuum condition sensed by the condition indicator 64 may register as a change of visual indicia on the condition indicator 64, such as a color change on a display 66 on condition indicator 64, where the color changes from green to red. The bypass valve 30 may remain open until the differential pressure across the strainer screen 14 reduces below the preset limit. When the bypass valve 30 closes, the vacuum condition in the indicator tube 64 vents and the display 66 will change back to its original state or condition, such as returning to green from red.

Accordingly, in view of the foregoing, the bypass valve assembly 10 provides a way to avoid or minimize compressor damage or failure as a result of the strainer screen 14 becoming fully or partially obstructed. As the strainer screen 14 becomes increasingly obstructed, differential pressure across the strainer screen 14 increases. The bypass valve assembly 10 may be set such that the bypass valve 30 opens when a predetermined or preset differential pressure across the strainer screen 14 is reached. When the bypass valve 30 opens, it becomes a full-flow inlet port to the oil pump (not shown), completely bypassing the strainer screen 14. In this manner, the air compressor 1 will not be starved of lubricating oil flow and pressure due to an obstructed strainer screen 14. The bypass valve assembly 10 avoids air compressor failures by bypassing an obstructed or partially obstructed strainer screen 14. However, when the bypass valve 30 opens due to obstruction, the air compressor 1 is in a vulnerable operating state. In this state, the air compressor 1 is operating without any lubricating oil filtering at the inlet to the oil pump (e.g., at outlet port 20), which allows debris to be circulated with the lubricating oil through the moving components of the air compressor 1. As a result, the indicator assembly 58 provides a way alert the user that the air compressor 1 is in a "bypass mode" and requires maintenance. The condition indicator 64 is desirably positioned on the exterior of the air compressor, such as the side cover access panel 2 on the crankcase. The condition indicator 64 includes the display 66 which may be a simple red/green process indicator, where the red region indicates that the bypass valve 30 is in bypass mode and the green region indicates the bypass valve 30 is closed or normal operation. While a visual indicator may be used, other warning forms may also be used such as an auditory warning that the air compressor 1 is in the bypass mode, or a combination of visual and auditory warnings may be provided. Moreover, the condition indicator 64 may be electronically linked to a remote console on the rail vehicle or other location, either directly or wirelessly, to alert a user of the bypass condition. Therefore, when there is no vacuum present in the indicator tube 62, the display 66 is typically green and when vacuum is present the display 66 is typically red.

The obstruction of the strainer screen 14 can generally be avoided by following proper maintenance practices such as periodic inspection, cleaning, and/or replacing the strainer screen 14. However, for many reasons, these practices are not always performed. Also, since the rate of obstruction may vary greatly depending on usage, environment, other maintenance practices, etc., it is often difficult to determine an adequate maintenance interval for the strainer screen 14. The inclusion of the bypass valve assembly 10 provides an apparatus to avoid catastrophic failure when these circumstances lead to obstruction of the strainer screen 14. Although the air compressor 1 is typically operating in a less than optimal condition when the bypass valve 30 is in the bypass mode, the benefit of avoiding catastrophic failure far outweighs the negative of operating, for a limited period, without proper lubricating oil filtering. Furthermore, the indicator system or assembly 58 provides a way to assure that the hours of operation spent in the bypass mode are limited. Generally, the bypass valve assembly 10 provides a "failsafe" condition so that poor maintenance practices do not result in catastrophic air compressor failures.

Furthermore, the bypass valve assembly 10 provides a benefit in cold temperature applications. In cold temperature applications, lubricating oil may become very thick when the air compressor 1 is not operating. When the air compressor 1 is started with cold lubricating oil, it takes more time for the more viscous lubricating oil to reach the internal components of the air compressor 1. This period of lack of lubrication may result in increased wear of the moving components of the air compressor 1. In these situations, the increased differential created by the thick lubricating oil being pulled through the strainer screen 14 results in the opening of the bypass valve 30. This unobstructed oil path through the bypass suction tube 56 temporarily provides the air compressor 1 with an adequate amount of lubricating oil. Once the lubricating oil begins to circulate, the pressure differential across the strainer screen 14 decreases and the bypass valve 30 closes.

While embodiments of an air compressor including an oil pump inlet strainer bypass valve assembly for railway and like vehicles and methods of operation thereof were provided in the foregoing description, those skilled in the art may make modifications and alterations to these embodiments without departing from the scope and spirit of the invention. Accordingly, the foregoing description is intended to be illustrative rather than restrictive. The invention described hereinabove is defined by the appended claims and all changes to the invention that fall within the meaning and the range of equivalency of the claims are to be embraced within their scope.

The invention claimed is:

1. An air compressor, comprising:
 a crankcase; and
 a bypass valve assembly in fluid communication with the crankcase to provide lubricating oil to the air compressor, the bypass valve assembly comprising:
  a valve housing defining an interior chamber;
  an oil strainer screen engaged with the valve housing to filter the lubricating oil entering the interior chamber;
  a bypass valve in fluid communication with the interior chamber and comprising a valve body having a bypass port and an indicator port;
  a suction tube connected to the bypass port on the valve body; and
  an indicator assembly connected to the indicator port on the valve body; and
 wherein the bypass valve opens to permit lubricating oil to enter the interior chamber via the suction tube without passing through the oil strainer screen when a predetermined differential pressure across the oil strainer screen is reached;
 wherein during normal operation of the air compressor lubricating oil passes through the oil strainer screen without passing through the bypass valve;
 wherein the valve body comprises a stem portion extending through an opening in the valve housing and into the interior chamber; and
 wherein the stem portion extends into the interior chamber to be positioned opposite to the oil strainer screen.

2. An air compressor as claimed in claim 1, wherein the valve housing comprises an outlet port for connection to an oil pump.

3. An air compressor as claimed in claim 1, wherein the bypass valve comprises a spring-biased ball valve.

4. An air compressor as claimed in claim 1, wherein the oil strainer screen is seated in a strainer port opening in the valve housing.

5. An air compressor as claimed in claim 1, wherein the indicator assembly comprises an indicator tube connected with the indicator port on the valve body, and a condition indicator in fluid communication with the indicator tube.

6. An air compressor as claimed in claim 5, wherein the condition indicator is a mechanical or an electronic device.

7. An air compressor as claimed in claim 5, wherein the condition indicator is adapted to detect a vacuum condition in the indicator tube.

8. An air compressor as claimed in claim 5, wherein the condition indicator includes a display to indicate that the bypass valve is open and permitting lubricating oil to enter the interior chamber via the suction tube without passing through the oil strainer screen.

9. An air compressor as claimed in claim 8, wherein the condition indicator display registers a change of visual indicia to indicate that the bypass valve is open and permitting lubricating oil to enter the interior chamber via the suction tube without passing through the oil strainer screen.

10. The air compressor as claimed in claim 1, wherein the oil strainer screen is located below the crankcase.

11. A bypass valve assembly for providing lubricating oil to an air compressor, comprising:
   a valve housing defining an interior chamber;
   an oil strainer screen engaged with the valve housing to filter the lubricating oil entering the interior chamber;
   a bypass valve in fluid communication with the interior chamber and comprising a valve body having a bypass port and an indicator port;
   a suction tube connected to the bypass port on the valve body; and
   an indicator assembly connected to the indicator port on the valve body; and
   wherein the bypass valve opens to permit lubricating oil to enter the interior chamber via the suction tube without passing through the oil strainer screen when a predetermined differential pressure across the oil strainer screen is reached;
   wherein during normal operation of the air compressor lubricating oil passes through the oil strainer screen without passing through the bypass valve;
   wherein the valve body comprises a stem portion extending through an opening in the valve housing and into the interior chamber; and
   wherein the stem portion extends into the interior chamber to be positioned opposite to the oil strainer screen.

12. A bypass valve assembly as claimed in claim 11, wherein the valve housing comprises an outlet port for connection to an oil pump.

13. A bypass valve assembly as claimed in claim 11, wherein the bypass valve comprises a spring-biased ball valve.

14. A bypass valve assembly as claimed in claim 11, wherein the oil strainer screen is seated in a strainer port opening in the valve housing.

15. A bypass valve assembly as claimed in claim 11, wherein the indicator assembly comprises an indicator tube connected with the indicator port on the valve body, and a condition indicator in fluid communication with the indicator tube.

16. A bypass valve assembly as claimed in claim 15, wherein the condition indicator is a mechanical or an electronic device.

17. A bypass valve assembly as claimed in claim 15, wherein the condition indicator is adapted to detect a vacuum condition in the indicator tube.

18. A bypass valve assembly as claimed in claim 15, wherein the condition indicator includes a display to indicate that the bypass valve is open and permitting lubricating oil to enter the interior chamber via the suction tube without passing through the oil strainer screen.

19. A bypass valve assembly as claimed in claim 18, wherein the condition indicator display registers a change of visual indicia to indicate that the bypass valve is open and permitting lubricating oil to enter the interior chamber via the suction tube without passing through the oil strainer screen.

20. The bypass valve assembly as claimed in claim 11, wherein the oil strainer screen is located below a crankcase.

* * * * *